United States Patent
Mihira

(10) Patent No.: US 9,471,860 B2
(45) Date of Patent: Oct. 18, 2016

(54) IMAGE FORMING APPARATUS AND POWER SAVING CONTROLLING METHOD FOR THE SAME

(71) Applicant: CANON KABUSHIKI KAISHA, Tokyo (JP)

(72) Inventor: Yoshiro Mihira, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/478,981

(22) Filed: Sep. 5, 2014

(65) Prior Publication Data

US 2015/0070721 A1 Mar. 12, 2015

(30) Foreign Application Priority Data

Sep. 9, 2013 (JP) .................................. 2013-186095

(51) Int. Cl.
  *G06K 15/00* (2006.01)
  *G06F 3/12* (2006.01)

(52) U.S. Cl.
  CPC .......... *G06K 15/4055* (2013.01); *G06F 3/126* (2013.01); *G06F 3/1221* (2013.01); *G06F 3/1229* (2013.01); *G06F 3/1285* (2013.01); *Y02B 60/1271* (2013.01)

(58) Field of Classification Search
  None
  See application file for complete search history.

(56) References Cited

U.S. PATENT DOCUMENTS

| 2007/0139702 | A1* | 6/2007 | Sato ....................... G06F 3/121 358/1.15 |
| 2007/0240159 | A1 | 10/2007 | Sugiyama |
| 2008/0316532 | A1 | 12/2008 | Fukuda |
| 2011/0176826 | A1* | 7/2011 | Yamamichi ........ G03G 15/5004 399/83 |
| 2012/0287928 | A1* | 11/2012 | Inoue ..................... H04L 43/12 370/390 |

FOREIGN PATENT DOCUMENTS

| EP | 2299677 A2 | 3/2011 |
| JP | 2003-220742 A | 8/2003 |
| JP | 2009-220416 A | 10/2009 |

* cited by examiner

*Primary Examiner* — Andrew H Lam
(74) *Attorney, Agent, or Firm* — Canon U.S.A., Inc. IP Division

(57) ABSTRACT

An image processing apparatus is connected to an image forming apparatus that operates at least in a standby state and in a power saving state requiring less power consumption than the standby state. The image processing apparatus, which is configured to perform image processing on an externally received print job and to input the print job to the image forming apparatus, includes a determination unit configured to determine a power state of the image forming apparatus, and a transmission unit configured to transmit a reserved print job to the image forming apparatus at a reserved time if the determined power state of the image forming apparatus is the power saving state, and to transmit the reserved print job to the image forming apparatus prior to the reserved time if the determined power state of the image forming apparatus is the standby state.

10 Claims, 11 Drawing Sheets

IMAGE FORMING APPARATUS AND POWER SAVING CONTROLLING METHOD FOR THE SAME

BACKGROUND OF THE INVENTION

1. Field of the Invention

The present invention relates to power saving control at a time of executing a scheduled print job in an image forming system equipped with an external image processing controller.

2. Description of the Related Art

In recent years, there has been a demand for power saving in an image forming apparatus, as in various other electrical appliances. Specifically, an image forming apparatus enters a sleep state while not being used to thus refrain, as much as possible, from consuming unnecessary electricity. The same applies to an external image processing controller, and there has been such a demand that the image processing controller enters a sleep state while not being used to thus reduce power consumption.

Meanwhile, some image forming apparatuses and external image processing controllers have a scheduled print function. Specifically, by a scheduled print function, if a user sets a time and inputs a scheduled print job, the set print job is executed at the set time.

Japanese Patent Application Laid-Open No. 2003-220742, for example, discusses a method for saving power in such scheduled printing. According to the method discussed in Japanese Patent Application Laid-Open No. 2003-220742, if there is a scheduled print job by the time at which a printer enters a sleep state (within a sleep timer time), the scheduled print job is executed successively to reduce the number of times the printer enters a power saving mode, and thus power consumption is reduced.

While the method according to Japanese Patent Application Laid-Open No. 2003-220742 is effective in saving power by moving forward a scheduled print job set to be executed within a sleep timer time and executing the schedule print job, the method is not effective in saving power for a scheduled print job set to be executed after the sleep timer time. In other words, an external image processing controller or an image forming apparatus needs to temporarily return from the sleep state only to print an accepted scheduled print job, causing such an issue that unnecessary power is consumed.

SUMMARY OF THE INVENTION

The present invention is directed to an image processing system in which an external image processing controller or an image forming apparatus refrains, as much as possible, from returning to a standby state in relation to processing of a scheduled print job, and thus power saving can be further expected.

According to an aspect of the present invention, an image processing apparatus is connected to an image forming apparatus that operates at least in a standby state and in a power saving state in which the image forming apparatus consumes less power than in the standby state, and the image processing apparatus is configured to perform image processing on an externally received print job and to input the print job to the image forming apparatus. The image processing apparatus includes a determination unit configured to determine a power state of the image forming apparatus, and a transmission unit configured to transmit a reserved print job to the image forming apparatus at a reserved time in a case in which the determination unit determines that the power state of the image forming apparatus is the power saving state, and to transmit the reserved print job to the image forming apparatus prior to the reserved time in a case in which the determination unit determines that the power state of the image forming apparatus is the standby state.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings. The components described in the following exemplary embodiments are, however, only examples, and are not to be construed as limiting the scope of the present invention.

Figure 1:
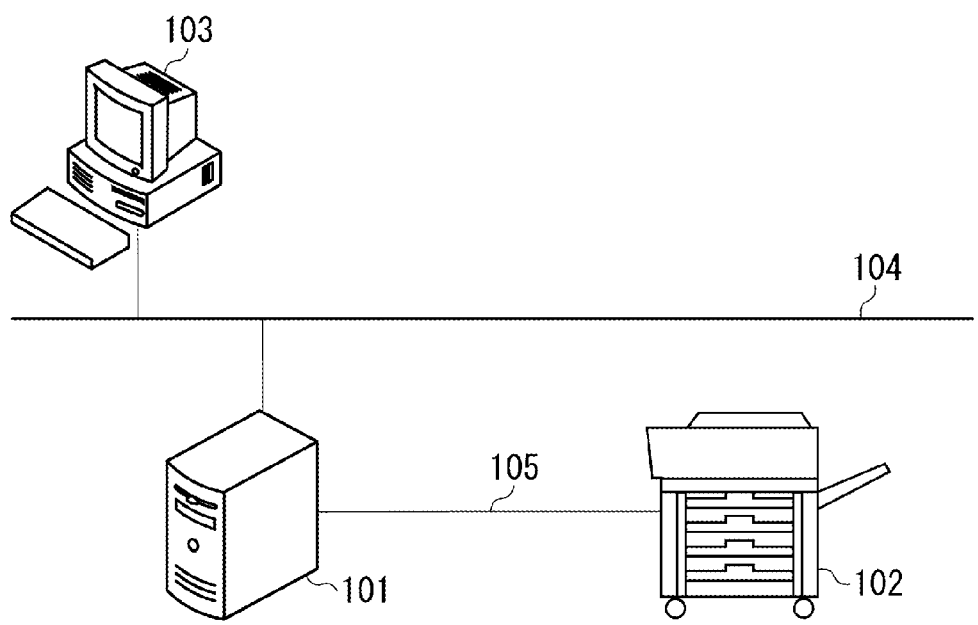
FIG. 1 illustrates an example of a configuration of an image forming system according to an exemplary embodiment of the present invention.

FIG. 1 illustrates an example of a configuration of an image forming system according to an exemplary embodiment of the present invention.

As illustrated in FIG. 1, an external image processing controller 101 is an image processing controller externally attached to an image forming apparatus 102. The external image processing controller 101 and the image forming apparatus 102 are interconnected via a network 105.

The image forming apparatus 102 serves as an image forming apparatus that, when combined with the external image processing controller 101, forms an image forming system. The external image processing controller 101 serves as an image processing apparatus that performs image processing (e.g., raster image processing (RIP) described below) on a print job received from the outside and inputs the print job, which has been subjected to image processing, to the image forming apparatus 102.

A personal computer (PC) client 103 is connected to a network 104. The PC client 103 can issue, via the network 104, a print instruction and a scheduled print job setting instruction to the image forming system, which includes the external image processing controller 101 and the image forming apparatus 102. In other words, the PC client 103 transmits a print job and a scheduled print job to the external image processing controller 101. Here, a scheduled print job refers to a print job (a reserved print job) that is set to be executed at a specified time.

The external image processing controller 101 and the PC client 103 are connected via the network 104. The network 104 is a network establishing a local area network (LAN) connection, a network such as Ethernet (registered trademark).

The external image processing controller 101 and the image forming apparatus 102 are connected via the network 105. The network 105 is a network establishing a LAN connection, a network such as Ethernet (registered trademark).

Figure 2:
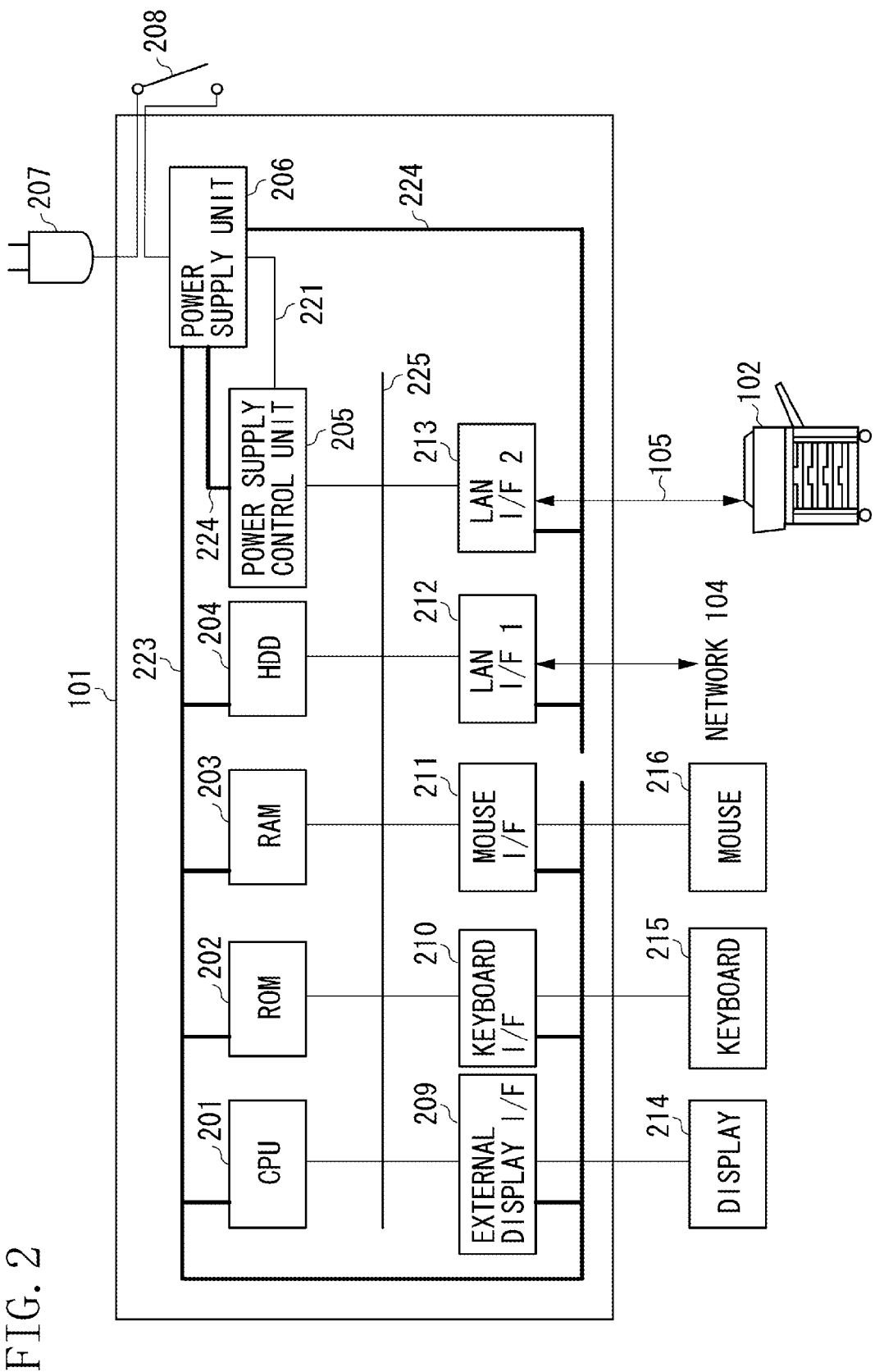
FIG. 2 illustrates an example of a hardware configuration of an external image processing controller.

FIG. 2 is a block diagram schematically illustrating an example of a hardware configuration of the external image processing controller 101.

As illustrated in FIG. 2, the external image processing controller 101 includes a central processing unit (CPU) 201, a read only memory (ROM) 202, a random access memory (RAM) 203, a hard disk drive (HDD) 204, a power supply control unit 205, a power supply unit 206, a power supply plug 207, and a main power supply switch 208. The external image processing controller 101 further includes an external display interface (I/F) 209, a keyboard I/F 210, a mouse I/F 211, a LAN I/F 1 (212), a LAN I/F 2 (213), and an internal bus 225.

The internal bus 225 is formed, for example, by a peripheral component interconnect (PCI) bus. The CPU 201, the ROM 202, the RAM 203, the HDD 204, the power supply control unit 205, the external display I/F 209, the keyboard I/F 210, the mouse I/F 211, the LAN I/F 1 (212), and the LAN I/F 2 (213) can perform data communication via the internal bus 225.

The CPU 201 loads and executes a program (e.g., software illustrated in FIG. 3) stored in the ROM 202 or the HDD 204 to thus implement various control operations. The ROM 202 stores programs and various types of data. The RAM 203 is used as a work area of the CPU 201. The HDD 204 stores software such as the one illustrated in FIG. 3, various types of data, print jobs, and so on. Here, in place of an HDD, a different storage device, such as a solid state drive (SSD), may be used.

The external display I/F 209 is an interface for connecting a display 214 thereto. The keyboard I/F 210 is an interface for connecting a keyboard 215 thereto. The mouse I/F 211 is an interface for connecting a pointing device, such as a mouse 216, thereto.

The external image processing controller 101 is connected to the network 104 via the LAN I/F 1 (212). The external image processing controller 101 can thus communicate with the PC client 103 via the network 104 and can receive a print job, such as a scheduled print job, from the PC client 103.

In addition, the external image processing controller 101 is connected to the network 105 via the LAN I/F 2 (213). The external image processing controller 101 can thus communicate with the image forming apparatus 102 via the network 105 and can issue a startup instruction and a print instruction to the image forming apparatus 102.

The power supply unit 206 is connected to the power supply plug 207 via the main power supply switch 208. Upon a user pressing (turning ON) the main power supply switch 208, alternating current power supply is supplied to the power supply unit 206 from the power supply plug 207, and the power supply unit 206 is started. The power supply unit 206 performs voltage direct current conversion of the alternating current power supply supplied from the power supply plug 207. The power supply unit 206 then supplies power to each module via a standby power supply line 224 and a main power supply line 223.

The power supply control unit 205 is connected to the internal bus 225 and the power supply unit 206. The power supply control unit 205 has a clock function and can set a time at which a scheduled print job is to be executed. The power supply control unit 205 issues a startup notification to the power supply unit 206 via a power supply unit control line 221 when the set time comes. Upon receiving the startup notification from the power supply control unit 205 via the power supply unit control line 221, the power supply unit 206 activates power supply to the main power supply line 223.

The standby power supply line 224 is a power supply line that is constantly supplied with power while the main power supply switch 208 is ON. The standby power supply line 224 constantly supplies power to the power supply control unit 205, which performs processing of issuing a power supply ON notification when the time for a scheduled print job comes, the LAN I/F 1 (212), and the LAN I/F 2 (213). The main power supply line 223 is a primary power supply line that is controlled by an instruction from the power supply control unit 205, and the main power supply line 223 supplies power in a standby state (also referred to as an ON state) and does not supply power in a sleep state (also referred to as a power saving state).

With the configuration described above, the power supply control unit 205 controls switching between a standby state (a state in which power is supplied from the main power supply line 223) and a sleep state (a state in which power is not supplied from the main power supply line 223) in which less power is consumed than in the standby state, in accordance with an instruction from the CPU 201, the LAN I/F 1 (212), the LAN I/F 2 (213), and so on or by the aforementioned clock function. The power supply control unit 205 causes the image forming apparatus 102 to return from the sleep state to the standby state in accordance with an execution time of a scheduled print job.

Figure 3:
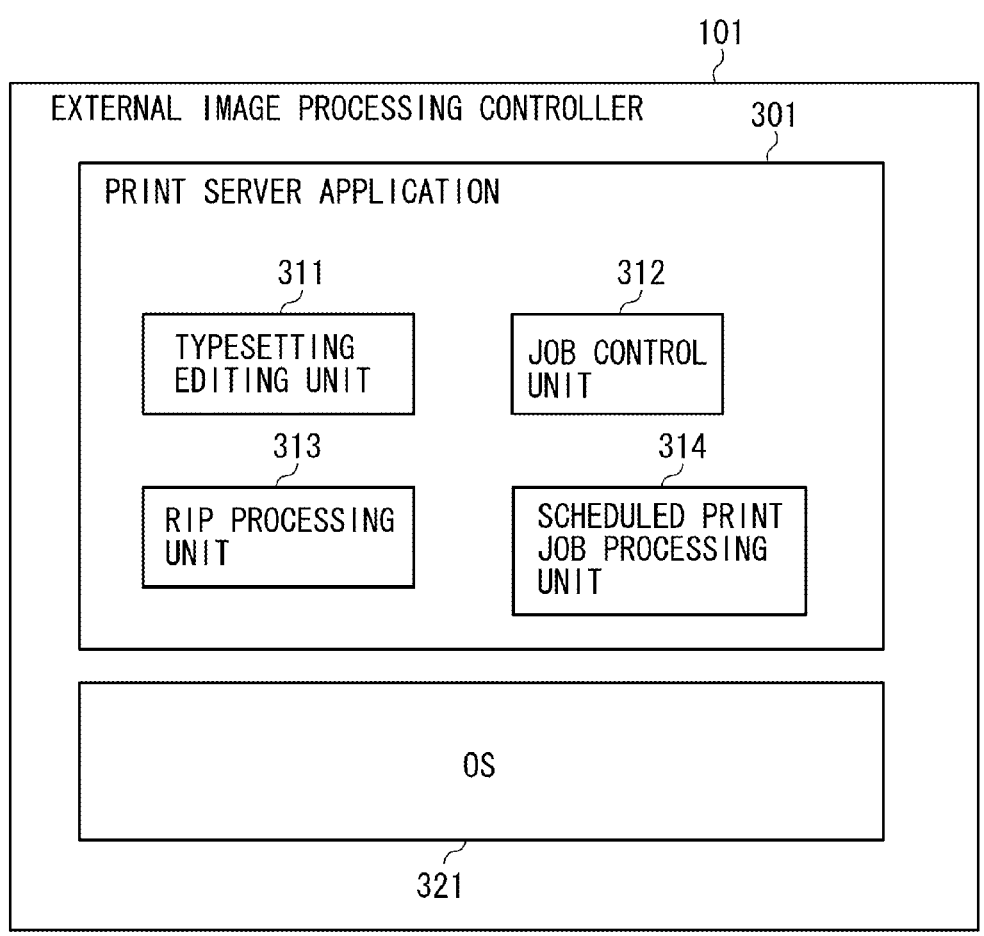
FIG. 3 illustrates an example of a software configuration of the external image processing controller.

FIG. 3 is a block diagram illustrating an example of a software configuration of the external image processing controller 101.

Each of the software blocks illustrated in FIG. 3 is stored in the ROM 202, the RAM 203, or the HDD 204 of the external image processing controller 101 and executed by the CPU 201. In other words, the CPU 201 executes each of the software blocks illustrated in FIG. 3 to thus realize the function of each of the software blocks illustrated in FIG. 3, which will be described hereinafter.

An operating system (OS) 321 is basic software of the external image processing controller 101. A print server application 301 is application software that operates on the OS 321 and is executed by the CPU 201. The print server application 301 includes a typesetting editing unit 311, a job control unit 312, a RIP processing unit 313, and a scheduled print job processing unit 314.

The typesetting editing unit 311 is an editing unit performing typesetting editing processing of editing image data of each page into a binding typesetting format based on an instruction from the PC client 103. The job control unit 312 controls print jobs based on an instruction from the PC client 103. Specifically, the job control unit 312 controls reception of print data from the PC client 103 and an instruction for printing the print data, and controls a printing order of print jobs such as jobs to be executed by the scheduled print job processing unit 314.

The RIP processing unit 313 is called at the time of typesetting by the typesetting editing unit 311, at the time of the raster image processing by the scheduled print job processing unit 314, or in a case in which the job control unit 312 performs actual image forming processing. The RIP processing unit 313 functions as a processing unit performing processing of converting a page description language (PDL) into a raster image for printing.

The scheduled print job processing unit 314 functions as a processing unit controlling a scheduled print job set from the PC client 103. For example, the scheduled print job processing unit 314 performs processes such as those illustrated in FIGS. 8 to 10, which will be described below.

Figure 4:
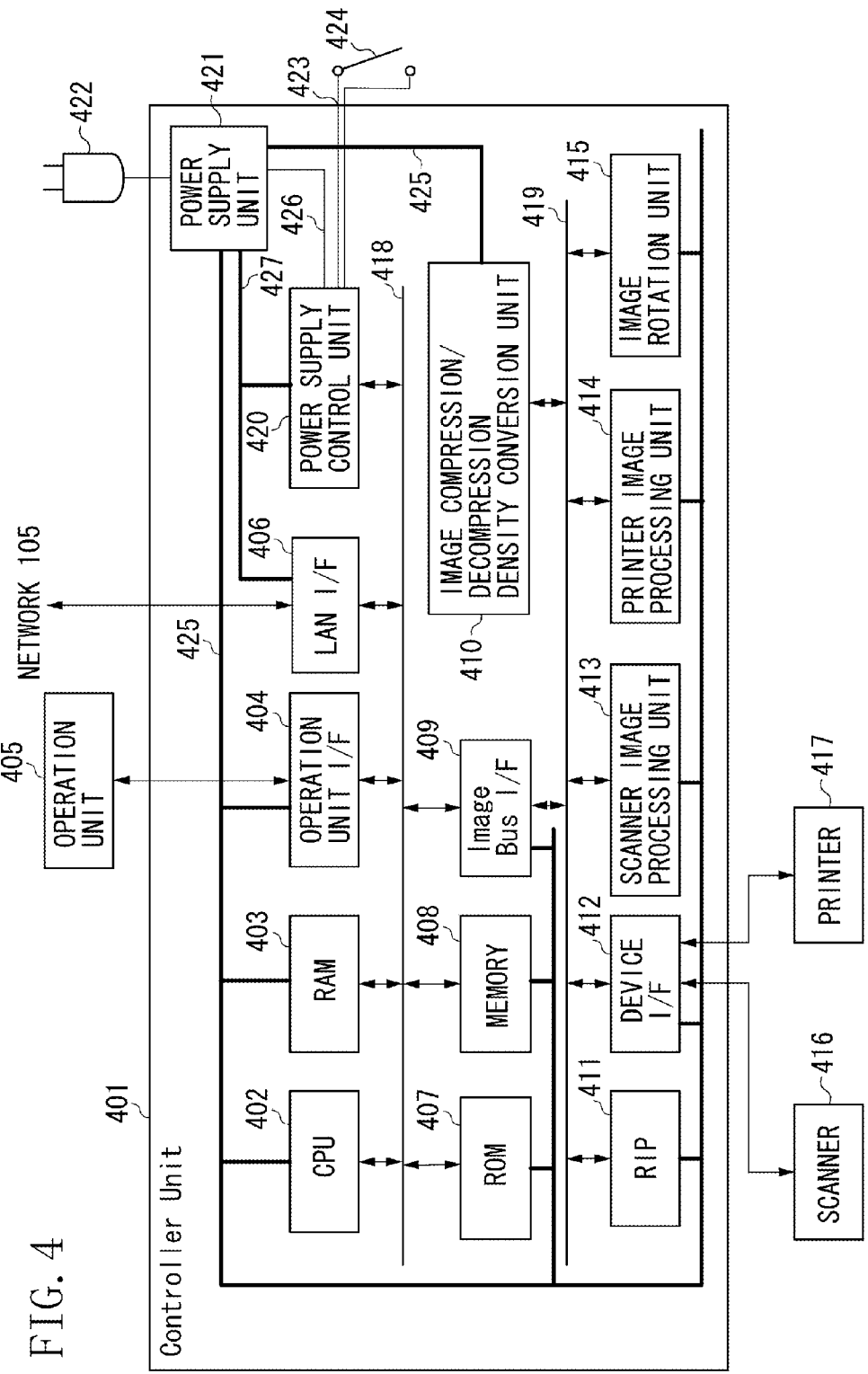
FIG. 4 illustrates an example of a hardware configuration of an image forming apparatus.

FIG. 4 is a block diagram schematically illustrating an example of a hardware configuration of the image forming apparatus 102.

Referring to FIG. 4, a controller unit 401 is connected to a scanner 416 and a printer 417. In addition, the controller unit 401 communicates with the external image processing controller 101 via the network 105. Since the controller unit 401 is connected to the aforementioned components, the controller unit 401 serves as a controller for inputting and outputting image information and device information.

A CPU 402 serves as a controller for controlling the entire system of the image forming apparatus 102. A RAM 403 serves as a system work memory for the CPU 402 to operate and also serves as an image memory for temporarily storing image data. A ROM 407 is a boot ROM and stores a boot program for the system of the image forming apparatus 102.

A memory 408 is a storage device, such as an HDD and an SSD, of the image forming apparatus 102. The memory 408 stores, for example, system software illustrated in FIG. 5, application software, and image data. As an image data storage area, the memory 408 stores a print job, such as a scheduled print job, received from the PC client 103 or the external image processing controller 101.

An operation unit I/F 404 is an interface unit for an operation unit 405 and outputs, to the operation unit 405, image data to be displayed on the operation unit 405. In addition, the operation unit I/F 404 has a function of transmitting from the operation unit 405 to the CPU 402 information input by a user of the image forming apparatus 102. A LAN I/F 406 is connected to the network 105 and inputs and outputs information.

An image bus I/F 409 is a bus bridge that transforms data structure and is connected to a system bus 418 and an image bus 419 that transfers image data at a high speed. The image bus 419 is formed by a PCI bus or the Institute of Electrical and Electronics Engineers (IEEE) 1394. A raster image processor (RIP) 411, a device I/F 412, a scanner image processing unit 413, a printer image processing unit 414, an image rotation unit 415, and an image compression/decompression density conversion unit 410 are arranged on the image bus 419.

The RIP 411 rasterizes a PDL code into a bitmap image. The device I/F 412 connects the scanner 416 and the printer 417 to the controller unit 401. The scanner image processing unit 413 corrects, processes, and edits image data input from the scanner 416. The scanner 416 is an image input device that reads an image such as a document to input image data.

The printer image processing unit 414 performs print correction, resolution conversion, and so forth on image data to be output to the printer 417. The printer 417 is an image output device that performs printing on a sheet based on image data. The image rotation unit 415 rotates image data. The image compression/decompression density conversion unit 410 converts multivalued image data to Joint Photographic Experts Group (JPEG) data, or performs on binary image data compression/decompression processing of the Joint Bi-level Image Experts Group (JBIG), Modified Modified READ (MMR), or Modified Huffman (MH).

A power supply control unit 420 is connected to the system bus 418 and is also connected to a main power supply switch 424 via a main power supply switch line 423. The power supply control unit 420 can detect the main power supply switch 424 being pressed by the user. Upon detecting the main power supply switch 424 being pressed, the power supply control unit 420 issues a startup notification to a power supply unit 421 via a power supply unit control line 426. In addition, the power supply control unit 420 has a clock function and can set a time at which a scheduled print job is to be executed. The power supply control unit 420 issues a startup notification to the power supply unit 421 via the power supply unit control line 426 when the set time comes. Upon receiving the startup notification from the power supply control unit 420 via the power supply unit control line 426, the power supply unit 421 activates power supply to a main power supply line 425.

The power supply unit 421 performs voltage direct current conversion of alternating current power supply supplied from a power supply plug 422, based on a notification from the power supply control unit 420. The power supply unit 421 then supplies power to each module via a standby power supply line 427 and the main power supply line 425.

The standby power supply line 427 is a supply line that is constantly supplied with power. The standby power supply line 427 constantly supplies power to the power supply control unit 420, which performs processing of issuing a power supply ON notification when the time for a scheduled print job comes, and the LAN I/F 406. The main power supply line 425 is a primary power supply line that is controlled by an instruction from the power supply control unit 420, and the main power supply line 425 supplies power in a standby state (also referred to as an ON state) and does not supply power in a sleep state (also referred to as a power saving state).

With the configuration described above, the power supply control unit 420 controls switching between a standby state (a state in which power is supplied from the main power supply line 425) and a sleep state (a state in which power is not supplied from the main power supply line 425) in which less power is consumed than in the standby state, in accordance with an instruction from the CPU 402, the LAN I/F 406, and so on, or by the aforementioned clock function.

Figure 5:
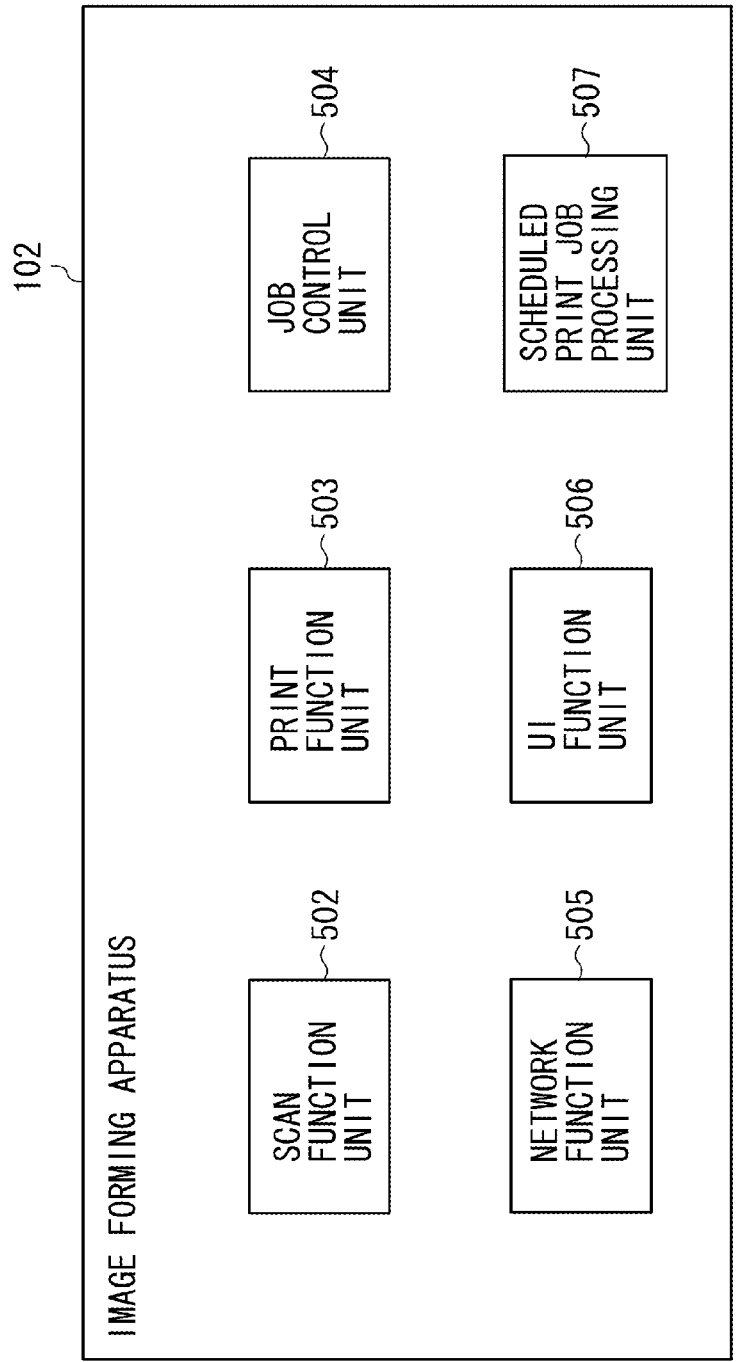
FIG. 5 illustrates an example of a software configuration of the image forming apparatus.

FIG. 5 is a block diagram illustrating an example of a configuration of software functions of the image forming apparatus 102. Each of the software blocks illustrated in FIG. 5 is stored in the memory 408 illustrated in FIG. 4 and is executed by the CPU 402. In other words, the CPU 402 executes each of the software blocks illustrated in FIG. 5 to thus realize the function of each of the software blocks illustrated in FIG. 5, which will be described hereinafter.

Referring to FIG. 5, a scan function unit 502 serves as a function unit for implementing a scan function with the use of the scanner 416. The scan function unit 502 has a function of reading a paper document and converting the result to binary or multivalued image data. A print function unit 503 serves as a function unit for implementing a print function with the use of the printer 417. The print function unit 503 has a function of outputting an image or the like that has been previously read and converted into image data by the scan function unit 502 to the printer 417 with a command to the printer 417 appended thereto.

A job control unit 504 queues image data received from the scan function unit 502 as a print job. In addition, the job control unit 504 queues a print job received from a network function unit 505 or a scheduled print job processing unit 507. The job control unit 504 then sequentially outputs queued jobs to the print function unit 503 or the network function unit 505, as appropriate.

The network function unit 505 has various network protocol functions such as the Transmission Control Protocol/Internet Protocol (TCP/IP), the HyperText Transfer Protocol (HTTP), the File Transfer Protocol (FTP), the Lightweight Directory Access Protocol (LDAP), the Simple Network Management Protocol (SNMP), the Simple Mail Transfer Protocol (SMTP), the Secure Sockets Layer (SSL), and the Server Message Block (SMB). For example, the network function unit 505 receives a scheduled print job or a print job from the PC client 103 or the external image processing controller 101 via the LAN I/F 406.

A user interface (UI) function unit 506 manages input and output by the user via the operation unit 405 of the image forming apparatus 102. In addition, the UI function unit 506 displays an input field, an output message field, and so forth on the operation unit 405. Thus, the UI function unit 506 receives a value input in the input field from the user and notifies the other function units of the value. Furthermore, the UI function unit 506 has a function of displaying, to the user, a message from the other function units on a predesigned screen.

The scheduled print job processing unit 507 controls a scheduled print job set from the external image processing controller 101. For example, the scheduled print job processing unit 507 performs processes such as those illustrated in FIG. 11, which will be described below.

Figure 6:
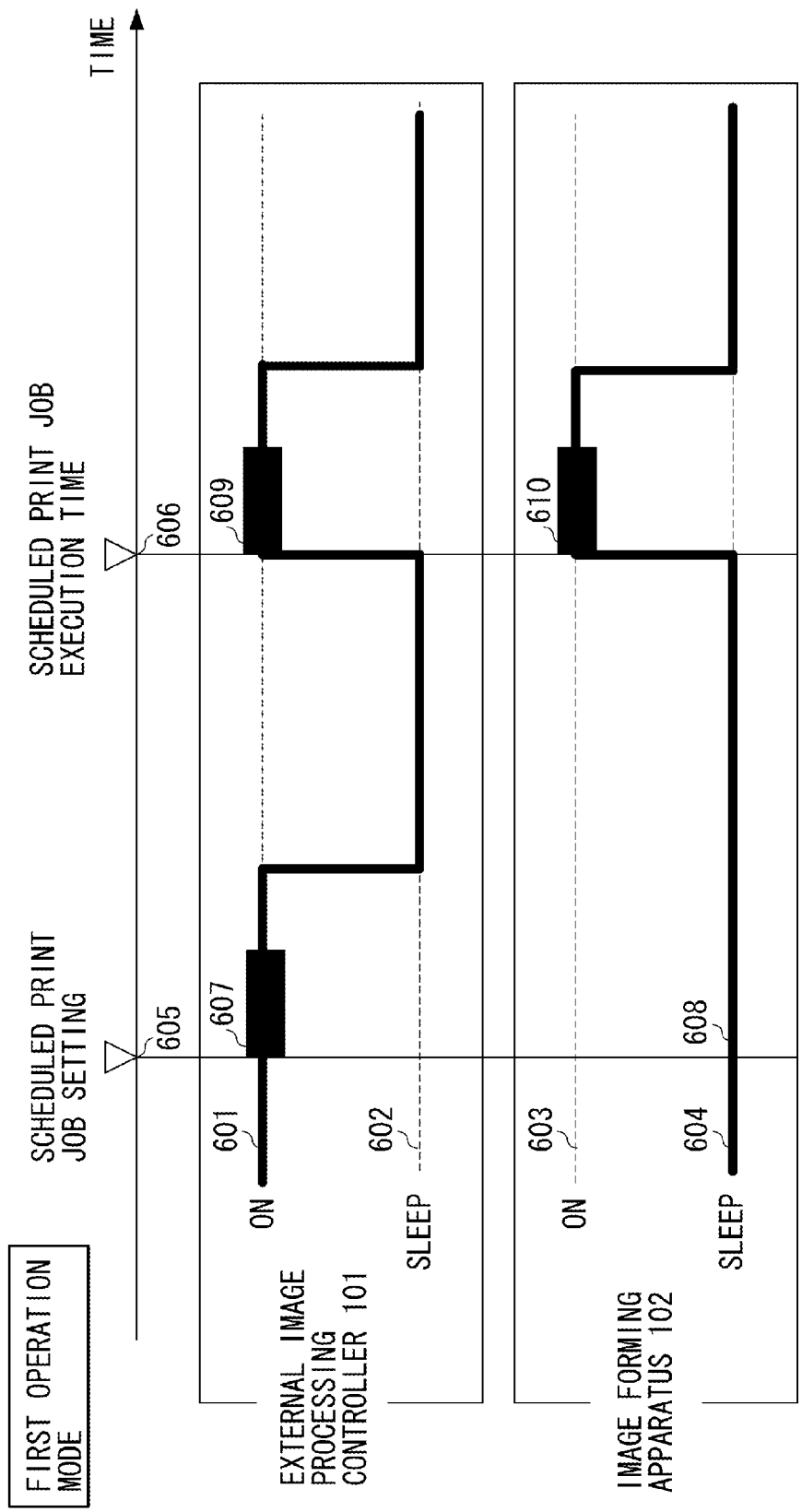
FIG. 6 is a sequence diagram of the image forming system in a first operation mode.
Figure 7:
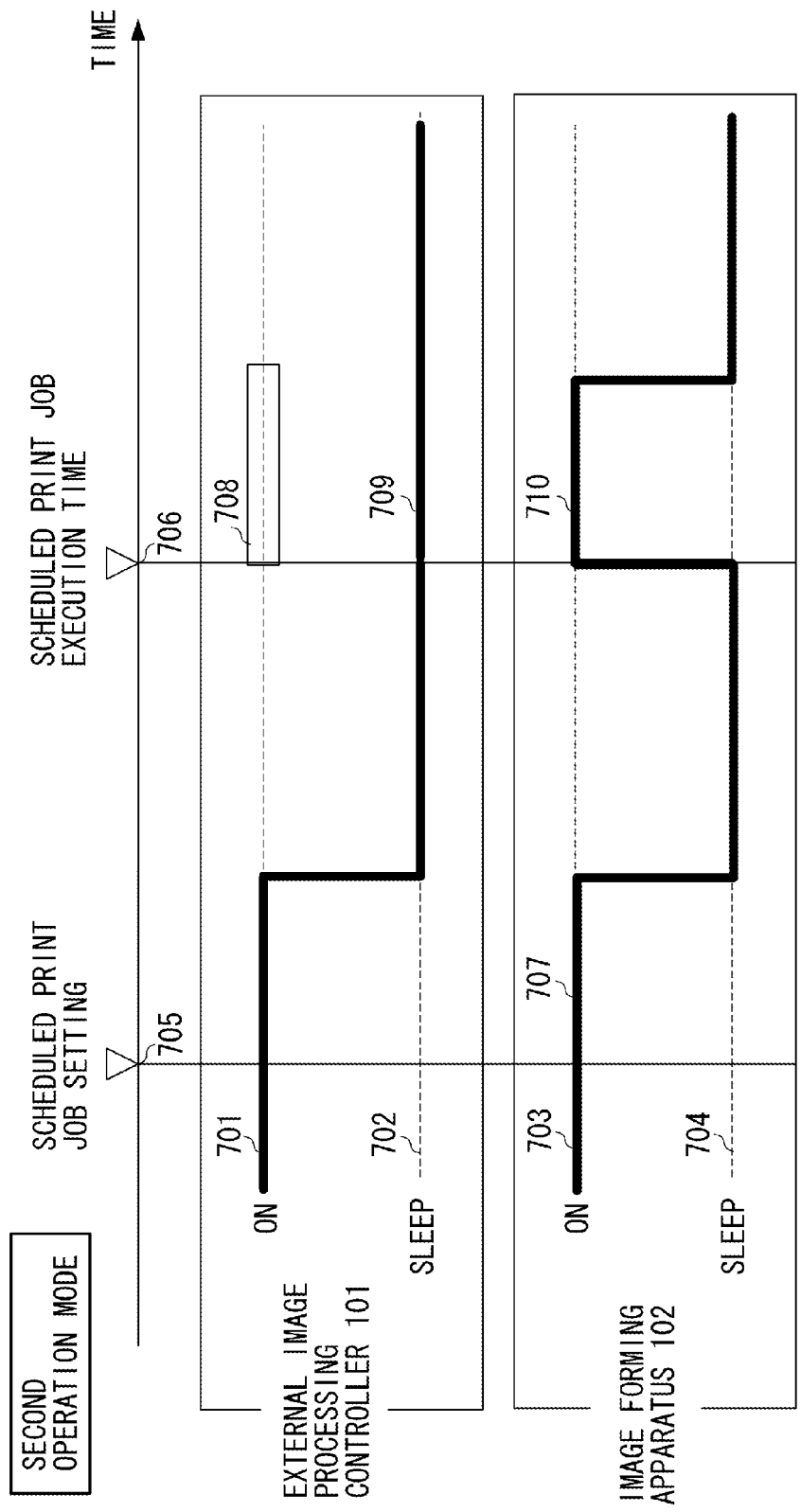
FIG. 7 is a sequence diagram of the image forming system in a second operation mode.

FIGS. 6 and 7 illustrate operations of the external image processing controller 101 and the image forming apparatus 102 in each power supply state at each timing in a case in which a scheduled print job is set from the PC client 103.

Lines 601 and 701 each correspond to a power supply state in a case in which the external image processing controller 101 is in a standby state (ON state). Lines 602 and 702 each correspond to a power supply state in a case in which the external image processing controller 101 is in a sleep state, that is, a power saving state. Similarly, lines 603 and 703 each correspond to a power supply state in a case in which the image forming apparatus 102 is in a standby state (ON state). Lines 604 and 704 each correspond to a power supply state in a case in which the image forming apparatus 102 is in a sleep state, that is, a power saving state.

Portions of the lines 601, 602, 701, and 702 which are indicated by the solid lines indicate the power supply state of the external image processing controller 101 at respective timings. For example, a portion 709 indicates that the external image processing controller 101 is in the sleep state. Meanwhile, portions of the lines 603, 604, 703, and 704 which are indicated by the solid lines indicate the power supply state of the image forming apparatus 102 at respective timings. For example, a portion 608 indicates that the image forming apparatus 102 is in the sleep state.

First, FIG. 6 illustrates a sequence corresponding to a first operation mode in the image forming system. In the first operation mode, if the image forming apparatus 102 is in the sleep state when a scheduled print job is input, the image forming apparatus 102 does not need to return from the sleep state.

Figure 8:
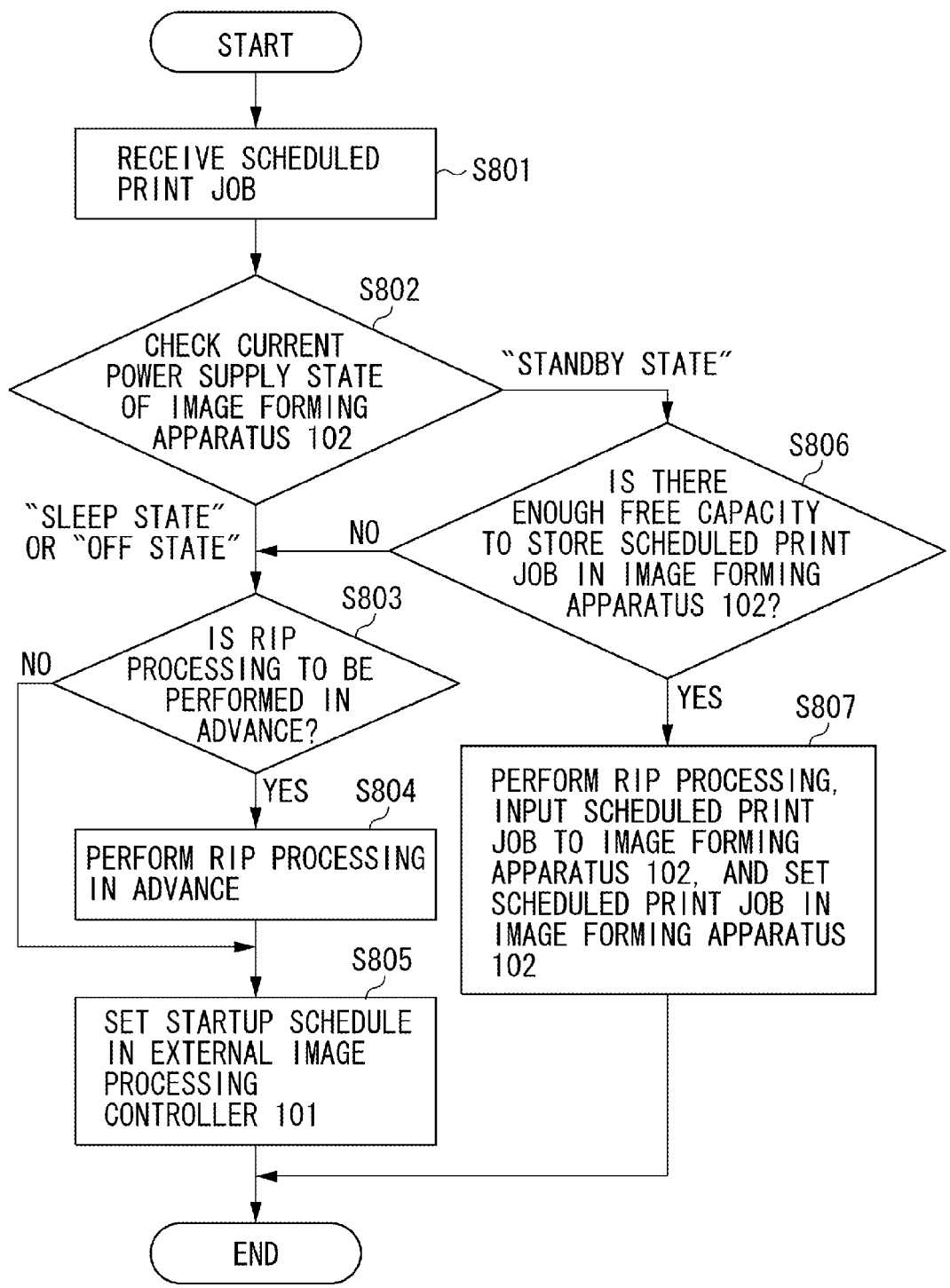
FIG. 8 is a flowchart illustrating an example of processing performed by the external image processing controller when a scheduled print job is received.

For example, at a timing 605, an instruction for a scheduled print job is issued from the PC client 103. Here, the image forming apparatus 102 is in the sleep state (indicated by the portion 608), and thus the external image processing controller 101 performs RIP processing on the scheduled print job without starting the image forming apparatus 102 (indicated by the portion 608), as illustrated in FIG. 8, which will be described below. In addition, the external image processing controller 101 stores the scheduled print job, which has been subjected to the RIP processing, in the HDD 204 (indicated by a portion 607). Through such an operation, the image forming apparatus 102 is not started unnecessarily when a scheduled print job is received, and thus power saving in the image forming system as a whole can be expected, as compared to a case in which the image forming apparatus 102 is started.

When the time to execute the scheduled print job (an execution time 606) comes, the external image processing controller 101 issues a startup instruction to the image forming apparatus 102 (indicated by portions 609 and 610) through the processing illustrated in FIG. 10, which will be described below, and executes printing of the scheduled print job.

Meanwhile, referring to FIG. 7, if the external image processing controller 101 is in the sleep state at the execution time when a scheduled print job is to be printed, the external image processing controller 101 does not need to return from the sleep state.

For example, at a timing 705, an instruction for a scheduled print job is issued from the PC client 103. Here, the image forming apparatus 102 is in the standby state (indicated by a portion 707), and thus the external image processing controller 101 performs the RIP processing on the scheduled print job, as illustrated in FIG. 8, which will be described below. In addition, the external image processing controller 101 transfers the scheduled print job, which has been subjected to the RIP processing, to the image forming apparatus 102 and registers the scheduled print job in a scheduled print job setting of the image forming apparatus 102. Thus, the external image processing controller 101 is not started at an execution time 706 of the scheduled print job (indicates by portions 708 and 709). At the execution time 706, only the image forming apparatus 102 is started (indicated by a portion 710), and the image forming apparatus 102 executes the scheduled print job, which will be described in detail with reference to FIG. 11. Through such an operation, the external image processing controller 101 is not started unnecessarily when a scheduled print job is executed, and thus power saving in the image forming system as a whole can be expected, as compared to a case in which the external image processing controller 101 is started.

Hereinafter, the operation of the external image processing controller 101 will be described with reference to FIGS. 8 to 10.

FIG. 8 is a flowchart illustrating processing executed by the CPU 201 of the external image processing controller 101 via the software in the scheduled print job processing unit 314 when setting a scheduled print job. The processing is performed by the CPU 201 in accordance with a program stored in a storage device such as the ROM 202, the RAM 203, or the HDD 204 of the external image processing controller 101.

First, in step S801, the CPU 201 receives a scheduled print job that has been instructed by a user of the PC client 103 and transmitted from the PC client 103, and then the processing proceeds to step S802.

In step S802, the CPU 201 checks the current power supply state of the image forming apparatus 102 via the LAN I/F 2 (213). Here, if the image forming apparatus 102 is in a sleep state or is powered OFF ("SLEEP STATE" or "OFF STATE" in step S802), the processing proceeds to step S803, and the CPU 201 stores the scheduled print job in the external image processing controller 101. Meanwhile, if the CPU 201 determines that the image forming apparatus 102 is in a standby state ("STANDBY STATE" in step S802), the processing proceeds to step S806.

The processing in step S803 is performed in a case in which the image forming apparatus 102 is in the sleep state or is powered OFF so that the external image processing controller 101 is unable to provide an instruction to the image forming apparatus 102. In step S803, the CPU 201 initially determines whether the RIP processing is set to be performed in advance when setting the scheduled print job in the external image processing controller 101. If the CPU 201 determines that the RIP processing is set to be performed in advance (YES in step S803), the processing proceeds to step S804. Meanwhile, if the CPU 201 determines that the RIP processing is not set to be performed in advance (NO in step S803), the processing proceeds to step S805.

Here, the setting as to whether the RIP processing is to be performed in advance is stored in the HDD 204, which is a non-volatile memory of the external image processing controller 101. The setting can be changed by operating the PC client 103 or the keyboard 215 or the mouse 216 of the external image processing controller 101. An instruction for changing the setting is processed by an application, which is executed by the CPU 201, of the scheduled print job processing unit 314 and is stored in the HDD 204.

In step S804, the CPU 201 causes the RIP processing unit 313 to perform the RIP processing on PDL data included in the scheduled print job that has been received in step S801, and the processing then proceeds to step S805.

In step S805, the CPU 201 stores, in the HDD 204, RIP image data in a case in which the RIP processing has been performed in step S804 or the aforementioned PDL data in a case in which the RIP processing is not performed. In addition, the CPU 201 causes the scheduled print job processing unit 314 to set a schedule, and the processing in this flowchart is terminated. When setting the schedule, the scheduled print job processing unit 314 sets, in the power supply control unit 205, the execution time of the scheduled print job as a startup time of the image forming apparatus 102. In other words, in the first operation mode (steps S803 to S805), the CPU 201 reserves the execution of the scheduled print job in the external image processing controller 101 itself.

Meanwhile, in step S806, the CPU 201 checks whether there is enough free capacity on the memory 408, which stores a scheduled print job, of the image forming apparatus 102 by inquiring of the image forming apparatus 102 via the network 105. If free capacity on the memory 408 is less than predetermined capacity, the CPU 201 determines that there is not enough free capacity on the memory 408 (NO in step S806). In that case, the CPU 201 cannot store the scheduled print job in the image forming apparatus 102, and thus the processing proceeds to step S803. Accordingly, the CPU 201 proceeds to the processing of storing the scheduled print job in the external image processing controller 101. Meanwhile, if the CPU 201 determines that there is enough free capacity on the memory 408 (YES in step S806), the processing proceeds to step S807.

In step S807, the CPU 201 causes the RIP processing unit 313 to perform the RIP processing on the scheduled print job that has been received in step S801. In addition, the CPU 201 transfers the image data, which has been subjected to the RIP processing, to the image forming apparatus 102, and sets the scheduled print job in the scheduled print job processing unit 507 of the image forming apparatus 102, and the processing in this flowchart is then terminated. In other words, in a second operation mode (step S807), the CPU 201 inputs the scheduled print job to the image forming apparatus 102 and reserves the execution of the scheduled print job in the image forming apparatus 102.

Figure 9:
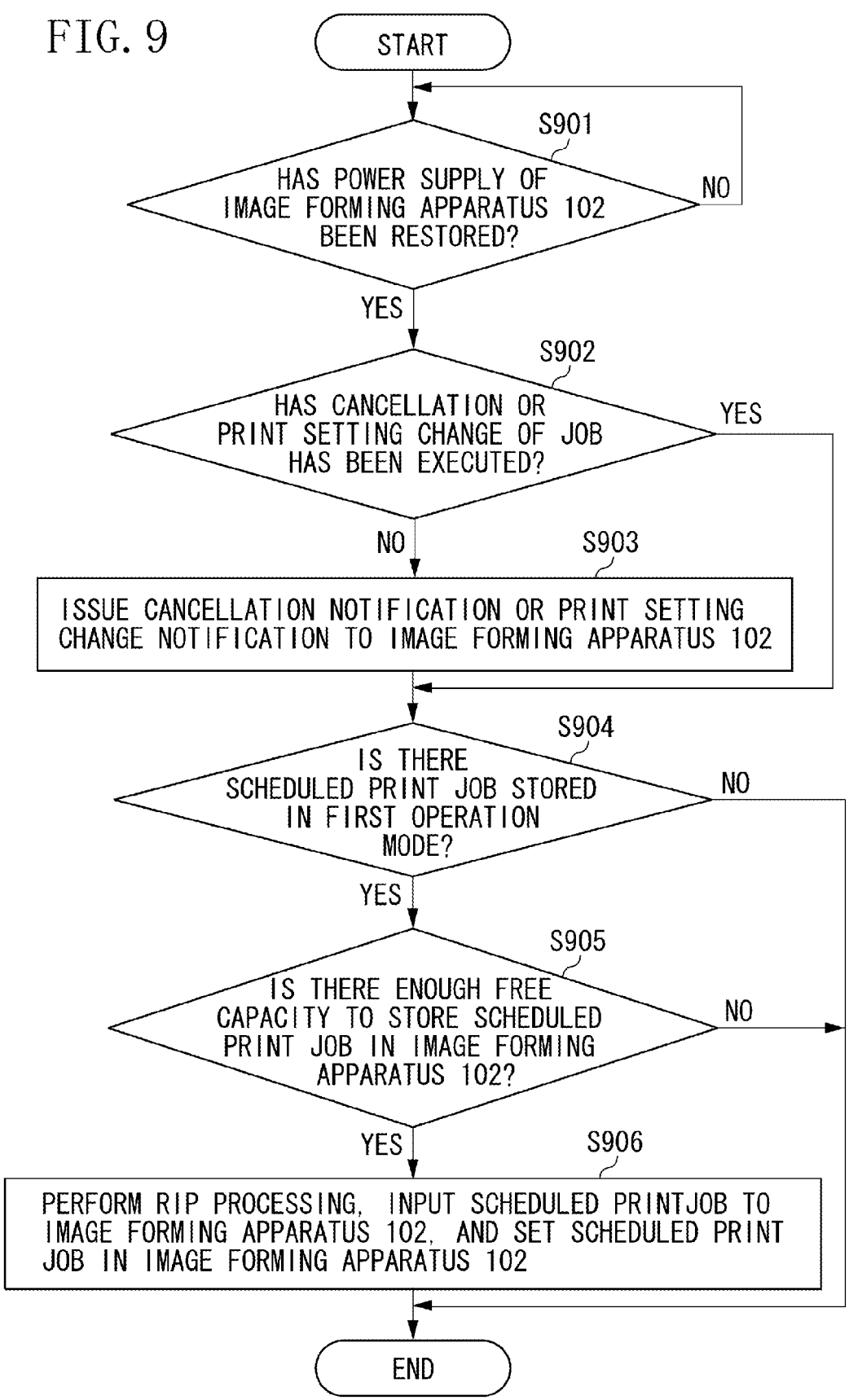
FIG. 9 is a flowchart illustrating an example of processing performed by the external image processing controller by a time when the scheduled print job is executed.

FIG. 9 is a flowchart illustrating an example of an operation executed by the CPU 201 of the external image processing controller 101 via the scheduled print job processing unit 314. Specifically, FIG. 9 is a flowchart illustrating processing of determining again, whether the scheduled print job that has been set in the external image processing controller 101 in step S805 of FIG. 8 can be transferred to the image forming apparatus 102 prior to the execution time of the scheduled print job. This processing is performed by the CPU 201 in accordance with a program stored in a storage device such as the ROM 202, the RAM 203, or the HDD 204 of the external image processing controller 101.

First, in step S901, the CPU 201 performs processing of detecting power supply restoration of the image forming apparatus 102 via the network 105. If the CPU 201 determines that the power supply of the image forming apparatus 102 has not been restored (NO in step S901), the CPU 201 performs the processing in step S901 again after a predetermined time period elapses. Meanwhile, if the CPU 201 determines that the power supply of the image forming apparatus 102 has been restored (YES in step S901), the processing proceeds to step S902.

In step S902, the CPU 201 determines whether cancellation or print setting change of the job has been instructed from the PC client 103 and such a cancellation or change has been already reflected on the scheduled print job in the image forming apparatus 102. If the CPU 201 determines that such a cancellation or change has not been reflected yet (NO in step S902), the processing proceeds to step S903. Meanwhile, if the CPU 201 determines that such a cancellation or change has already been reflected (YES in step S902), the processing proceeds to step S904.

In step S903, the CPU 201 issues a cancellation notification or a print setting change notification of the relevant scheduled print job to the image forming apparatus 102, and the processing then proceeds to step S904.

In step S904, the CPU 201 determines whether there is a job that is still stored in the external image processing controller 101 in the first operation mode because the image forming apparatus 102 had been in the sleep state when the scheduled print job was set. If the CPU 201 determines that there is a job that is still stored in the external image processing controller 101 (YES in step S904), the processing proceeds to step S905. Meanwhile, if the CPU 201 determines that there is no job that is still stored in the external image processing controller 101 (NO in step S904), the processing in this flowchart is terminated.

In steps S905 and S906, the CPU 201 performs processes that are respectively similar to the processes in steps S806 and S807 of FIG. 8. Specifically, in step S905, the CPU 201 checks whether there is enough free capacity on the memory 408, which stores a scheduled print job, of the image forming apparatus 102 by inquiring of the image forming apparatus 102 via the network 105. If the CPU 201 determines that there is not enough free capacity on the memory 408 (NO in step S905), the CPU 201 cannot store the scheduled print job in the image forming apparatus 102, and thus the processing in this flowchart is terminated. Meanwhile, if the CPU 201 determines that there is enough free capacity on the memory 408 (YES in step S905), the processing proceeds to step S906.

In step S906, if the scheduled print job has not been subjected to the RIP processing, the CPU 201 causes the RIP processing unit 313 to perform the RIP processing on the scheduled print job. In addition, the CPU 201 transfers the image data, which has been subjected to the RIP processing, to the image forming apparatus 102, and sets the scheduled print job in the scheduled print job processing unit 507 of the image forming apparatus 102, and the processing in this flowchart is then terminated.

Through the above-described series of processes, even in a case in which the user changes the setting of the scheduled print job, when the scheduled print job is to be executed, the image forming apparatus 102 can appropriately execute by itself the scheduled print job with the changed setting while the external image processing controller 101 remains in the sleep state. Thus, power saving can be expected as compared to a case in which the external image processing controller 101 returns from the sleep state.

Figure 10:
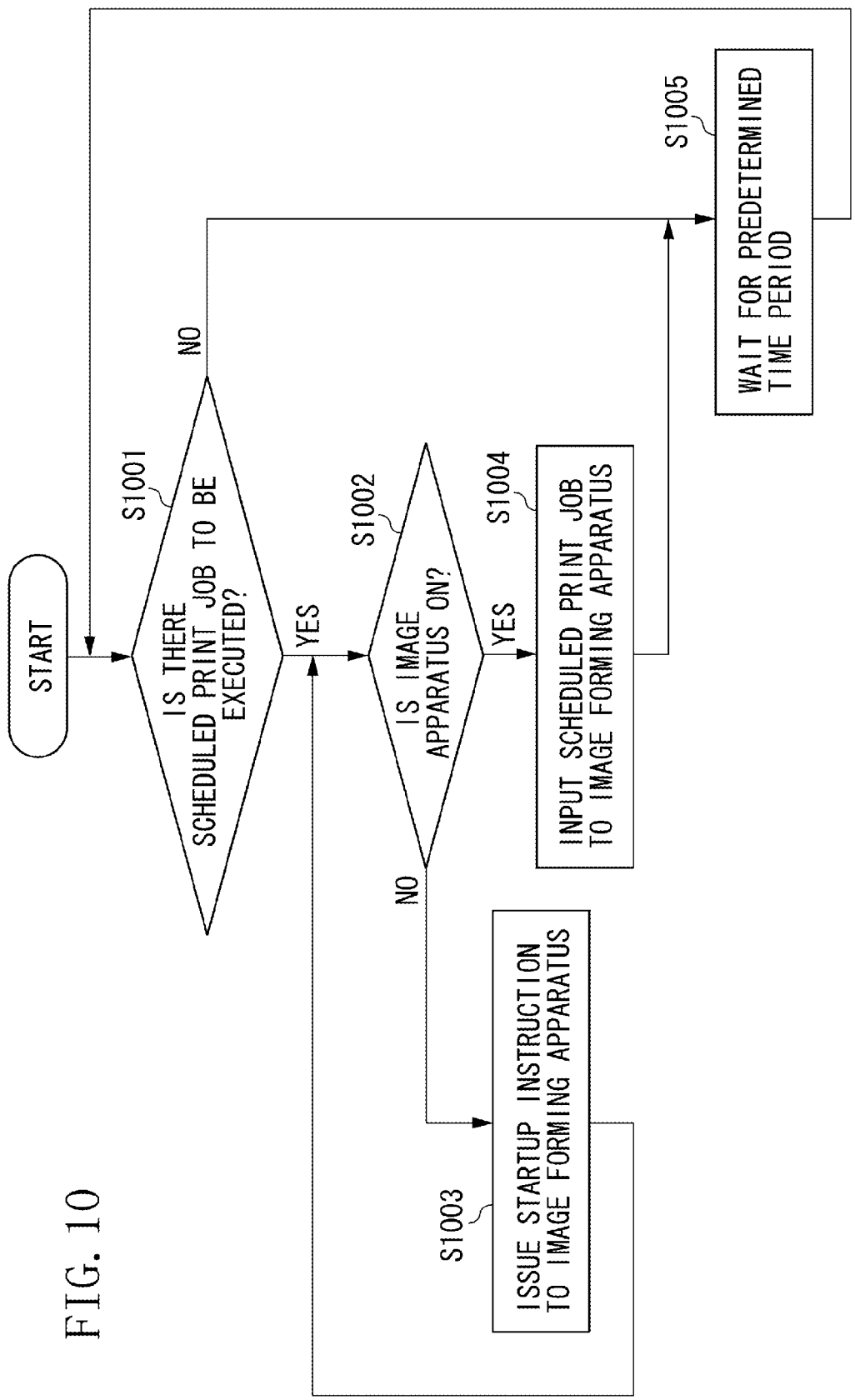
FIG. 10 is a flowchart illustrating an example of processing performed by the external image processing controller at the time when the scheduled print job is executed.

FIG. 10 is a flowchart illustrating en example of print processing executed by the CPU 201 of the external image processing controller 101 via the software of the scheduled print job processing unit 314 at the execution time 606 of the scheduled print job. This operation corresponds to an operation performed in a case in which the image forming apparatus 102 does not have an opportunity to return from the sleep state by the execution time of the scheduled print job or in a case in which there is not enough capacity to store the schedule print job in the image forming apparatus 102. As a sequence diagram, this operation corresponds to the first operation mode illustrated in FIG. 6. The processing is performed by the CPU 201 in accordance with a program stored in a storage device such as the ROM 202, the RAM 203, or the HDD 204 of the external image processing controller 101.

Initially, in step S1001, the CPU 201 determines whether there is a scheduled print job to be executed at that point in time in the HDD 204. If the CPU 201 determines that there is no scheduled print job to be executed (NO in step S1001), in step S1005, the CPU 201 waits for a predetermined time period (e.g., one minute), and the processing returns to step S1001. Meanwhile, if the CPU 201 determines that there is a scheduled print job to be executed (YES in step S1001), the processing proceeds to step S1002.

In step S1002, the CPU 201 checks the power supply state of the image forming apparatus 102. If the CPU 201 determines that the image forming apparatus 102 is in the sleep state (is not ON, i.e., not in the standby state)) (NO in step S1002), in step S1003, the CPU 201 issues a startup instruction to the image forming apparatus 102 via the network 105. The CPU 201 then waits for a predetermined time period, and the processing returns to step S1002. Meanwhile, if the CPU 201 determines that the image forming apparatus 102 is ON (in the standby state) (YES in step S1002), the processing proceeds to step S1004.

In step S1004, the CPU 201 issues a print instruction to the image forming apparatus 102 via the network 105 so that all of the scheduled print jobs that have been determined to be executed in step S1001 are executed. In other words, the CPU 201 inputs all of the scheduled print jobs that have been determined to be executed in step S1001 to the image forming apparatus 102. Then, in step S1005, the CPU 201 waits for a predetermined time period (e.g., one minute), and the processing returns to step S1001, in which the CPU 201 determines whether there is a scheduled print job to be executed.

Subsequently, the operation of the image forming apparatus 102 will be described with reference to FIG. 11.

Figure 11:
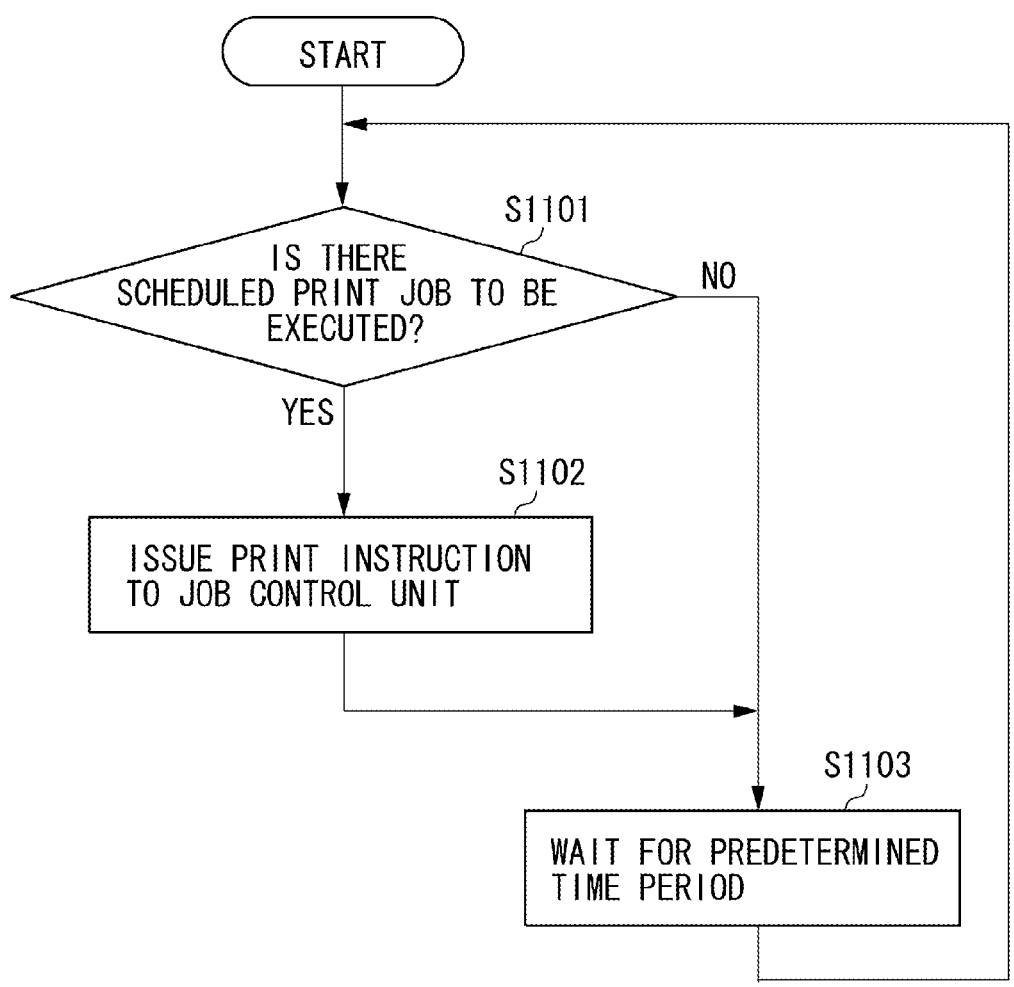
FIG. 11 is a flowchart illustrating an example of processing performed by the image forming apparatus at the time when the scheduled print job is executed.

FIG. 11 is a flowchart illustrating an example of print processing executed by the CPU 402 of the image forming apparatus 102 via the software of the scheduled print job processing unit 507 at the execution time 706 of the scheduled print job. This processing is performed by the CPU 402 in accordance with a program stored in a storage device such as the RAM 403, the ROM 407, or the memory 408 of the image forming apparatus 102.

First, in step S1101, the CPU 402 determines whether there is a scheduled print job to be executed at that point in time in the memory 408. If the CPU 402 determines that there is no scheduled print job to be executed (NO in step S1101), in step S1103, the CPU 201 waits for a predetermined time period (e.g., one minute), and the processing returns to step S1101. Meanwhile, if the CPU 402 determines that there is a scheduled print job to be executed (YES in step S1101), the processing proceeds to step S1102.

In step S1102, the CPU 402 issues a print instruction to the job control unit 504 so that all of the scheduled print jobs that have been determined to be executed in step S1101 are executed. Then, in step S1103, the CPU 402 waits for a predetermined time period (e.g., one minute), and the processing returns to step S1101, in which the CPU 402 determines whether there is a scheduled print job to be executed.

Through the above-described operation, when setting the scheduled print job set in the external image processing controller 101, the first operation mode and the second operation mode can be switched in accordance with the power supply state of the image forming apparatus 102, as illustrated in FIG. 8, and thus power saving can be expected.

In addition, even if the image forming system is operated in the first operation mode when the scheduled print job is set, as illustrated in FIG. 9, if the image forming apparatus 102 enters the standby state thereafter, the image forming system can be switched to the second operation mode, and thus power saving can be expected. Furthermore, as indicated in step S806 of FIG. 8 or in step S905 of FIG. 9, even in a case in which the image forming system is operated in the second operation mode, the operation modes can be switched as appropriate by checking the remaining capacity in the image forming apparatus 102.

In addition, as indicated in steps S902 and S903 of FIG. 9, even if the user cancels or changes the settings for the scheduled print job while the image forming system is operated in the second operation mode, the image forming apparatus 102 is not started unnecessarily, and thus power saving can be expected. Furthermore, if the image forming apparatus 102 is started for some other reasons before the execution time of the scheduled print job, by canceling or changing the settings of the scheduled print job as appropriate, power saving can be expected.

In addition, since the RIP processing can be set to be executed or not to be executed immediately after setting the scheduled print job, the RIP processing is prevented from being performed unnecessarily on a scheduled print job having the print settings which are likely to be changed, and thus power saving can be expected.

As described above, by switching the operation modes in accordance with the power supply state of the image forming apparatus 102 when setting the scheduled print job, the image forming system provides the following power saving effects. In the first operation mode, the image forming apparatus 102 does not need to return from the sleep state when a scheduled print job is input, and thus power saving can be further expected. In the second operation mode, the external image processing controller 101 does not need to return from the sleep state only to execute the printing of a scheduled print job, and thus power saving can be further expected. In other words, the external image processing controller 101 does not need to return temporarily from the sleep state only to execute the printing of a scheduled print job that has been already accepted and has been set to be printed, and thus unnecessary power consumption can be suppressed.

Accordingly, the external image processing controller 101 or the image forming apparatus 102 is prevented, as much as possible, from returning to a standby state in relation to the processing of a scheduled print job, thereby providing a system in which power saving can be further expected.

The configurations and the content of the various types of data described above are not limited to those described above, and it is needless to say that various other configurations and content can be employed in accordance with the intended use and the purpose.

While an exemplary embodiment of the present invention has been described above, the present invention can be implemented in the form of, for example, a system, an apparatus, a method, a program, a storage medium, or the like. Specifically, the present invention may be applied to a system that is constituted by a plurality of devices or to an apparatus constituted by a single device.

The present invention can also be realized by executing the following processing. Specifically, software (a program) that realizes the functions of the exemplary embodiment described above is supplied to a system or to an apparatus via a network or various storage media, and a computer (or a CPU, a microprocessor unit (MPU), or the like) in the system or in the apparatus loads and executes the program.

The present invention is not limited to the exemplary embodiment described above. Various modifications (including an organic combination of the exemplary embodiments) can be made based on the spirit of the present invention, and such modifications are encompassed within the scope of the present invention. In other words, the present invention encompasses any configuration in which the exemplary embodiments and modifications thereof described above are combined.

According to an exemplary embodiment of the present invention, an image forming apparatus can be prevented, as much as possible, from returning to a standby state in relation to the processing of a reserved print job, and thus power saving can be further expected.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-186095 filed Sep. 9, 2013, which is hereby incorporated by reference herein in its entirety.

What is claimed is:

1. An image processing apparatus connected to an image forming apparatus that forms an image on a sheet based on image data, the image processing apparatus being configured to generate the image data based on a print job and to transmit the image data to the image forming apparatus via a network, the image processing apparatus comprising:
   a power control unit configured to shift the image processing apparatus from a first power state in which the image processing apparatus is able to generate image data to a second power state in which the image processing apparatus is not able to generate image data;
   a receiving unit configured to receive a print job to which a reserved time at which the image forming apparatus is to form an image is specified;
   a generation unit configured to generate image data based on the print job received by the receiving unit prior to the reserved time; and
   a transmission unit configured to transmit the image data generated by the generation unit to the image forming apparatus prior to the reserved time and to make a reservation so as to enable the image forming apparatus to form the image based on the image data at the reserved time,
   wherein the image forming apparatus keeps the transmitted image data stored in a storage unit prior to the reserved time and forms, at the reserved time, the image on the sheet based on the stored image data.

2. The image processing apparatus according to claim 1, wherein the transmission unit transmits the image data to the image forming apparatus at the reserved if free capacity of an area storing image data in the image forming apparatus is less than predetermined capacity.

3. The image processing apparatus according to claim 1, wherein the transmission unit transmits the image data to the image forming apparatus prior to the reserved time if the image forming apparatus is in a standby state and the transmission unit transmits the image data to the image forming apparatus at the reserved time if the image forming apparatus is in a power saving state in which power consumption is lower than power consumption in the standby state.

4. The image processing apparatus according to claim 3, wherein the generation unit generates the image data prior to the reserved time and the transmission unit transmits the image data to the image forming apparatus at the reserved time, if the image forming apparatus is in a power saving state in which power consumption is lower than power consumption in the standby state.

5. The image processing apparatus according to claim 4, wherein the power control unit shifts the image processing apparatus from the second power state to the first power state at the reserved time and the transmission unit transmits the image data to the image forming apparatus when the image processing apparatus is shifted from the second power state to the first power state.

6. The image processing apparatus according to claim 1, further comprising:
   a notification unit configured to, in a case wherein image forming processing based on the image data that has been transmitted to the image forming apparatus is canceled or changed, notify that the image forming processing has been canceled or changed.

7. The image processing apparatus according to claim 1, further comprising:
   a setting unit configured to set whether the image data is to be generated based on the print job prior to the reserved time,
   wherein, in a case in which the setting unit has set the image data is to be generated prior to the reserved time, the generation unit generates image data based on the print job received by the receiving unit prior to the reserved time.

8. The image processing apparatus according to claim 1, wherein the generation unit generates image data based on a page description language described in the print job.

9. A method for controlling an image processing apparatus connected to an image forming apparatus that forms an image on a sheet based on image data, the image processing apparatus being configured to generate the image data based on a print job and to transmit the image data to the image forming apparatus via a network, the method comprising:
   shifting, by a power control unit, the image processing apparatus from a first power state in which the image processing apparatus is able to generate image data to a second power state in which the image processing apparatus is not able to generate image data;
   receiving, by a receiving unit, a print job to which a reserved time at which the image forming apparatus is to form an image is specified;
   generating, by a generation unit, image data based on the print job received by the receiving unit prior to the reserved time; and
   transmitting, by a transmission unit, the image data generated by the generation unit to the image forming apparatus at the reserved time and to make a reservation so as to enable the image forming apparatus to form the image based on the image data at the reserved time,
   wherein the image forming apparatus keeps the transmitted image data stored in a storage unit prior to the reserved time and forms, at the reserved time, the image on the sheet based on the stored image data.

10. A non-transitory recording medium that stores a computer-readable program of an image forming apparatus that is performed by a computer, the program comprising:
    a first code for shifting the image processing apparatus from a first power state in which the image processing apparatus is able to generate image data to a second power state in which the image processing apparatus is not able to generate image data;
    a second code for receiving a print job to which a reserved time at which the image forming apparatus is to form an image is specified;
    a third code for generating image data based on the print job received prior to the reserved time; and
    a fourth code for transmitting the image data unit to the image forming apparatus at the reserved time and to make a reservation so as to enable the image forming apparatus to form the image based on the image data at the reserved time,
    wherein the image forming apparatus keeps the transmitted image data stored in a storage unit prior to the reserved time and forms, at the reserved time, the image on the sheet based on the stored image data.

* * * * *